United States Patent [19]

Parker

[11] 4,160,071
[45] Jul. 3, 1979

[54] TAPERED PLATE LUG FOR CAST-ON POST COLLECTION BARS

[75] Inventor: John R. Parker, Toledo, Ohio
[73] Assignee: Barrett Battery, Inc., Toledo, Ohio
[21] Appl. No.: 905,223
[22] Filed: May 12, 1978
[51] Int. Cl.² ............................................. H01M 4/02
[52] U.S. Cl. ..................................... 429/211; 429/178
[58] Field of Search ......................... 429/211, 233, 178

[56] References Cited

U.S. PATENT DOCUMENTS

| | | | |
|---|---|---|---|
| 417,055 | 12/1889 | Logan | 429/81 |
| 669,064 | 2/1901 | Collins | 429/233 |
| 915,063 | 3/1909 | Bender | 429/209 |

Primary Examiner—Charles F. LeFevour
Attorney, Agent, or Firm—Hugh Adam Kirk

[57] ABSTRACT

A wedge-shaped end on the lug of a secondary battery plate grid which is about three-quarters inserted in the molten lead in a post collector bar mold of an automatic cast-on machine for casting this lug integrally with a plurality of lugs of other lead plate grids. The capillary action of the molten lead fills the unimmersed parts of wedge-shaped ends of the lugs to produce integral bridges of substantially uniform rectangular cross-section between the plate grids and the collector bar.

2 Claims, 5 Drawing Figures

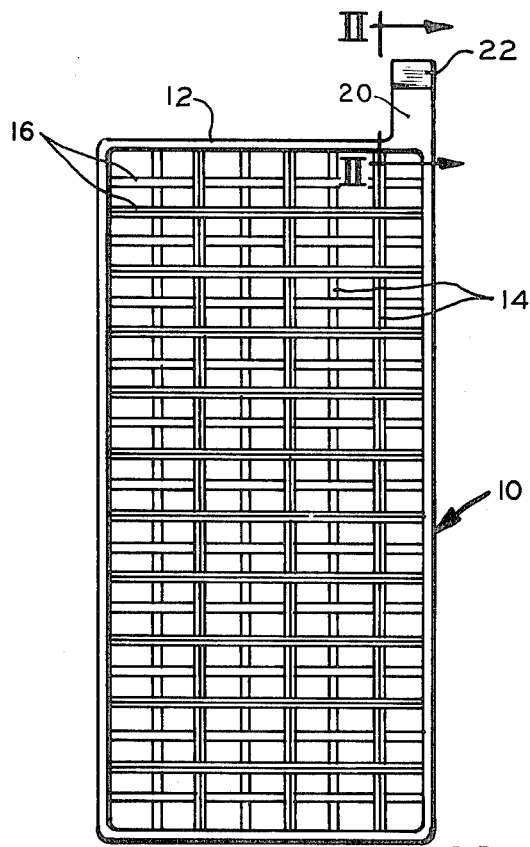
FIG. I
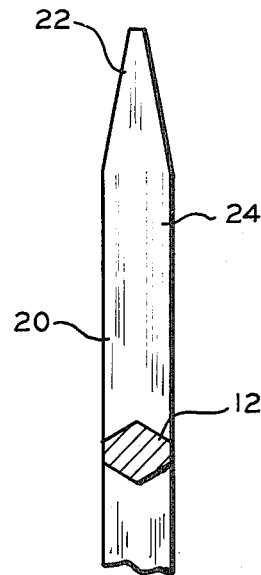
FIG. II
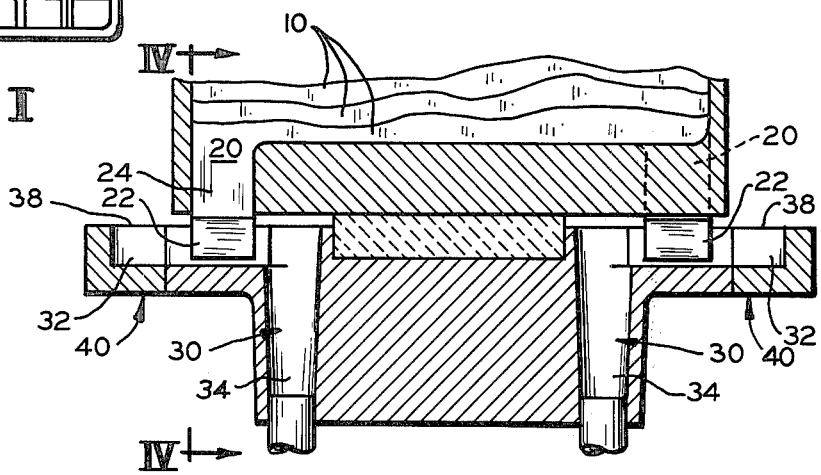
FIG. III
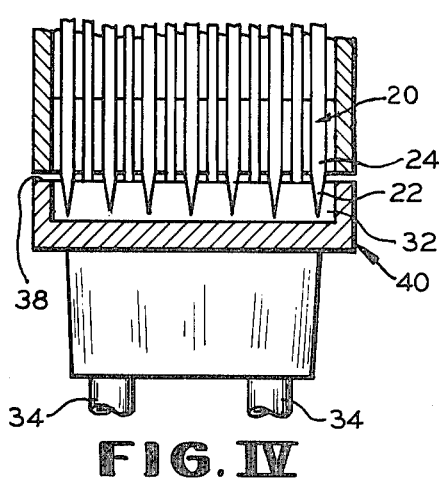
FIG. IV
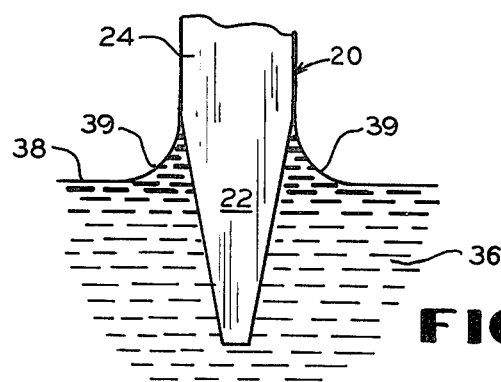
FIG. V

TAPERED PLATE LUG FOR CAST-ON POST COLLECTION BARS

BACKGROUND OF THE INVENTION

Previously, tapered ends on lugs of lead battery plates have been used for the snug fit and easy removal of battery connections, such as shown in Logan U.S. Pat. No. 417,055 issued Dec. 10, 1889, or for decoration as shown in Bender U.S. Pat. No. 915,063 issued Mar. 16, 1909, or for easy release from a mold such as the bevelled edges of the plate grid shown in Carlile U.S. Pat. No. 2,671,944 issued Mar. 16, 1954.

It is also known in cast-on procedures that the reduction of the mass of metal which is inserted into the molten metal decreases the thermoconductivity away from the molten metal such as taught in McMahan U.S. Pat. No. 2,332,330 issued Oct. 19, 1943.

However, for casting-on collectors or terminals to lead battery plates in an automatic machine, various methods have been employed to control the rate of solidification of the lead in the mold after the lugs have been inserted therein, so that they do not conduct too much heat away from the molten metal in the mold and solidify it too quickly, such as by the application of additional heat to the mold as taught in Galloway U.S. Pat. No. 2,454,052 issued Nov. 16, 1954, or by preheating the lugs before they are inserted into the mold as taught in Sabatino et al U.S. Pat. No. 3,253,306 issued May 31, 1966. Thus the known prior art machines required additional heat and the expenditure of more energy in order to produce an effective cast-on lead collector bar to lead battery plate grid lugs.

SUMMARY OF THE INVENTION

Generally speaking, applicant has solved the above problems by reshaping or forming the lug on the lead battery plate grids so as to reduce its volume and mass, which not only saves the amount of lead required, but also does not cool the molten lead in the collector bar mold so that additional heat has to be applied thereto, as well as cooling so that the parts will solidify promptly after they are fused together. Thus, by using a tapered or wedge-shaped outer end on the lug, which is not all inserted into the molten lead of the collector bar mold, only about half the mass of cold lead is immersed in the molten lead.

More specifically, the lug on the upper corner of each of the positive and negative lead plate grids employed in secondary batteries, is substantially rectangular in cross-section as it extends away from the frame of the grid for about two-thirds of the length of the lug and then the outer third is tapered on each longer side to form a wedge-shaped end of a thickness of about one-quarter of that of the untapered lug. When this tapered end is about three-quarters immersed into the molten lead in the collector bar mold of an automatic casting machine, the capillary action of the surface of the molten lead fills in the tapered portion which is not immersed so that the final assembly contains lugs of substantially uniform rectangular cross-section extending from the frame of each plate grid to the collector bar to which they are now integrally attached.

OBJECTS AND ADVANTAGES

Accordingly, it is an object of this invention to produce an efficient, effective, economic, simple lead battery grid plate lug which has material advantages and economy of saving both lead and heat energy when employed in an automatic machine for casting-on the collector bar and posts for a plurality of these plates for a battery cell.

BRIEF DESCRIPTION OF THE VIEWS

The above mentioned and other features, objects and advantages, and a manner of attaining them are described more specifically below by reference to an embodiment of this invention shown in the accompanying drawings, wherein:

FIG. I—is a plan view of a lead secondary battery plate grid with a lug according to this invention attached to one upper corner of the frame of the plate;

FIG. II—is an enlarged sectional view of one side of the lug taken along line II—II of FIG. I showing the tapered or wedge-shaped outer end of the lug;

FIG. III—is an enlarged sectional view through a mold of a machine for automatically casting-on the lugs of a plurality of secondary lead battery plates as shown in FIG. I to the collector bar with posts, with parts of the plates being broken away;

FIG. IV—is a reduced sectional view taken along line IV—IV of FIG. III; and

FIG. V—is an enlarged view of the wedge-shaped end of a lug according to this invention inserted into molten metal showing the capillary action of the surface of the molten metal filling in the unimmersed tapered portion of the lug to form a bridging connection of substantially uniform rectangular cross-section.

DETAILED DESCRIPTION OF PREFERRED EMBODIMENT

In FIG. I there is shown one embodiment of a lead plate grid 10 having a top border or frame member 12 from one end of which projects outwardly a connecting electrically conductive terminal or lug 20. Inside the frame of the plate grid 10 there are vertical and horizontal bars or rods 14 and 16, respectively, the spaces between which are filled with active ingredient or lead oxide paste before the battery is assembled.

The enlarged edge or end view of the lug 20 in FIG. II shows a tapered wedge-shaped end 22 for about one-third of the length of the lug 20 above the top rail 12 of the frame, with the remaining portion 24 of the lug between the wedged end portion 22 and the rail 12 being substantially uniform in rectangular cross-section. The tapered end 22 is bevelled or tapered on each side thereof to form a wedge-shape which reduces in cross-section to about one-quarter the width of the section 24.

Referring now to FIGS. III, IV and V, there is disclosed a method and parts of a machine for automatically and simultaneously casting the tapered ends 22 of the lugs 20 on a plurality of plates 10 onto a collector bars 30, one for the positive plates and the other for the negative plates, as they are assembled for a battery cell. Each collector bar comprises a bar portion 32 and a pair of posts 34 which are formed of molten lead 36 (see FIG. V) introduced into the separate collector bar molds 40 of an automatic cast-on machine.

As shown best in FIG. V, only about the lower two-thirds or three-quarters of the tapered end 22 of each of the lugs 20 is immersed below the molten surface 38 of the liquid lead in the molds 40, and the capillary action of the surface 38 forms a meniscus 39 to fill the upper portions of the wedge-shaped section 22, so that when the cast-on juncture is completed the section 24 of the lug has a substantially uniform rectangular cross-section throughout its length at least of the same area as section 24 between the collectors 30 and the plates 10.

Material and unexpected advantages of this particular construction of the wedge-shaped ends 22 on the lugs 20 of such secondary lead battery plates is that not only do they reduce the amount of lead which is used in each of the plates, but also reduce by about 50% or more the amount of mass which can conduct heat away from the molten lead 36 in the molds 40 when immersed therein. This enables the reduction, if not the elimination, of preheating the lugs 20 before inserting them in the mold, and/or providing additional heaters below the molds 40 adjacent the place where the lugs 22 are immersed in the molten lead in these molds to prevent too rapid cooling of the molten lead 36, and thereby forming a poor connection.

While there is described above the principles of this invention in connection with specific apparatus, it is to be clearly understood that this description is made only by way of example and not as a limitation to the scope of this invention.

I claim:

1. A secondary battery plate having a grid and a lug extending outwardly from one side edge of said grid in the same plane of the plate and of the same thickness as said side edge, said lug having a rectangular cross-section for about the first two-thirds of its length from said side edge, and then having at one end a wedge-shaped outer third of its length tapering to about one-quarter of said thickness of said lug whereby when the lug is inserted into the mold for a collector bar to be integrally cast thereon with the lugs of adjacent plate grids in a machine, said tapered ends are less than completely immersed in the melted metal in the mold so that the capillary action of the molten metal fills-in the unimmersed tapered portion of the lug to produce a lug connection from the grid to the collector bar which connection has a uniform cross-section of at least that of the untapered rectangular cross-section of the lug.

2. A secondary battery plate having a grid and a lug extending outwardly from one side edge of said grid in the same plane of said plate and having the same substantial thickness as said plate, said lug having a uniform rectangular cross-section for about the first two-thirds of its length from said side edge, and then having at one end a wedge-shaped outer third of its length tapered only on two opposite sides to about one-quarter of said thickness of said lug whereby the heat required to fuse said lug to its collector bar in an automatic cast-on machine is materially reduced, and the molten metal in the collector bar mold of the machine is not chilled but melts the lug and forms, due to the capillary action of the surface of the molten metal in the mold when the tapered end is less than completely immersed in the molten metal, a connection between the plate and the collector bar that has uniformly rectangular cross-section of at least that of the lug portion that was not tapered with molten metal filling the unimmersed tapered portion of the lug.

* * * * *